(12) United States Patent
Yoon et al.

(10) Patent No.: US 11,957,180 B2
(45) Date of Patent: Apr. 16, 2024

(54) AEROSOL GENERATING DEVICE AND OPERATION METHOD THEREOF

(71) Applicant: KT&G CORPORATION, Daejeon (KR)

(72) Inventors: Sung Wook Yoon, Gyeonggi-do (KR); Seung Won Lee, Gyeonggi-do (KR); Dae Nam Han, Seoul (KR)

(73) Assignee: KT&G CORPORATION, Daejeon (KR)

( * ) Notice: Subject to any disclaimer, the term of this patent is extended or adjusted under 35 U.S.C. 154(b) by 737 days.

(21) Appl. No.: 17/059,049

(22) PCT Filed: Oct. 21, 2020

(86) PCT No.: PCT/KR2020/014417
§ 371 (c)(1),
(2) Date: Nov. 25, 2020

(87) PCT Pub. No.: WO2021/080321
PCT Pub. Date: Apr. 29, 2021

(65) Prior Publication Data
US 2022/0295903 A1    Sep. 22, 2022

(30) Foreign Application Priority Data

Oct. 21, 2019  (KR) .................. 10-2019-0130400

(51) Int. Cl.
*A24F 40/60*     (2020.01)
*A24F 40/51*     (2020.01)
(Continued)

(52) U.S. Cl.
CPC .............. *A24F 40/60* (2020.01); *A24F 40/51* (2020.01); *A24F 40/57* (2020.01); *A24F 40/65* (2020.01)

(58) Field of Classification Search
CPC ........... A24F 40/60; A24F 40/65; A24F 40/51
See application file for complete search history.

(56) References Cited

U.S. PATENT DOCUMENTS 7,480,147 B2 *  1/2009  Hoss .................. G06F 1/20
                                                        361/721
9,681,287 B2    6/2017  Yang et al.
(Continued)

FOREIGN PATENT DOCUMENTS

GB         2534726 A    8/2016
JP      2014-149823 A   8/2014
(Continued)

OTHER PUBLICATIONS

Office Action dated Feb. 9, 2023 from the Korean Intellectual Property Office in KR Application No. 10-2022-0075682.
(Continued)

*Primary Examiner* — Phuong Chi Thi Nguyen
(74) *Attorney, Agent, or Firm* — Sughrue Mion, PLLC

(57) ABSTRACT

An aerosol generating device includes: a holder configured to generate aerosols; and a cradle which displays, on the display, data obtained from the sensor and an indicator for activating a user interface, outputs through the user interface a plurality of pre-stored temperature profiles in response to a first user input of selecting the indicator, and in response to a second user input of selecting any one of the plurality of the pre-stored temperature profiles, transmits the selected temperature profile to the holder such that the holder controls a temperature profile used to heat an aerosol generating material based on the selected temperature profile.

14 Claims, 5 Drawing Sheets

(51) Int. Cl.
  *A24F 40/57* (2020.01)
  *A24F 40/65* (2020.01)

(56) References Cited

U.S. PATENT DOCUMENTS

| | | | |
|---|---|---|---|
| 10,172,392 | B2 | 1/2019 | Sur et al. |
| 10,321,711 | B2 | 6/2019 | Henry, Jr. et al. |
| 2016/0219933 | A1 | 8/2016 | Henry, Jr. et al. |
| 2017/0042232 | A1 | 2/2017 | Gorilovsky |
| 2018/0043114 | A1 | 2/2018 | Bowen et al. |
| 2018/0093054 | A1 | 4/2018 | Bowen et al. |
| 2018/0132529 | A1 | 5/2018 | Sur et al. |
| 2018/0314296 | A1 | 11/2018 | Evans et al. |
| 2020/0221773 | A1 | 7/2020 | An |
| 2020/0237014 | A1 | 7/2020 | Lee et al. |
| 2020/0305512 | A1 | 10/2020 | Lim et al. |
| 2022/0087311 | A1 | 3/2022 | Han et al. |

FOREIGN PATENT DOCUMENTS

| | | | |
|---|---|---|---|
| JP | 2018-509139 | A | 4/2018 |
| JP | 2019-521739 | A | 8/2019 |
| KR | 10-2016-0108855 | A | 9/2016 |
| KR | 10-1883262 | B1 | 7/2018 |
| KR | 10-2018-0114825 | A | 10/2018 |
| KR | 10-2018-0124739 | A | 11/2018 |
| KR | 10-2019-0035643 | A | 4/2019 |
| KR | 10-2019-0051785 | A | 5/2019 |
| KR | 10-1994297 | B1 | 6/2019 |
| KR | 10-2019-0078647 | A | 7/2019 |
| KR | 10-2019-0082302 | A | 7/2019 |
| WO | 2017/029089 | A1 | 2/2017 |
| WO | 2018/092095 | A1 | 5/2018 |
| WO | 2019/088382 | A1 | 5/2019 |
| WO | 2019/198552 | A1 | 10/2019 |

OTHER PUBLICATIONS

Office Action dated Apr. 20, 2023 from the Korean Intellectual Property Office in KR Application No. 10-2022-0075682.
Office Action dated Apr. 6, 2023 from the China National Intellectual Property Administration in CN Application No. 202080003901.X.
Partial Supplementary European Search Report dated Nov. 25, 2021 in European Application No. 20807257.9.
Office Action dated Feb. 15, 2022 in Japanese Application No. 2020-572533.
International Search Report dated Mar. 8, 2021, issued by the International Searching Authority in application No. PCT/KR2020/014417.
Communication dated Mar. 24, 2021, issued by the Korean Intellectual Property Office in application No. 10-2019-0130400.

* cited by examiner

[Fig. 1]
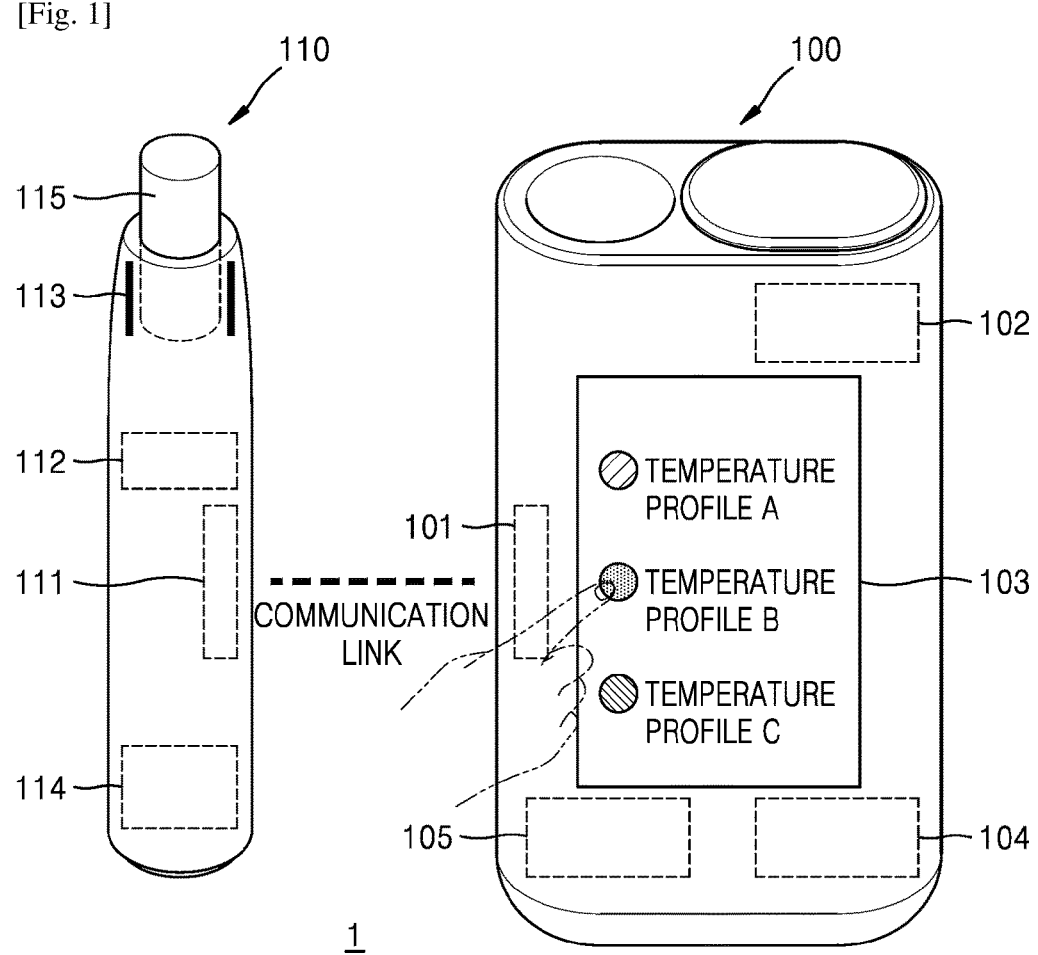
[Fig. 2]
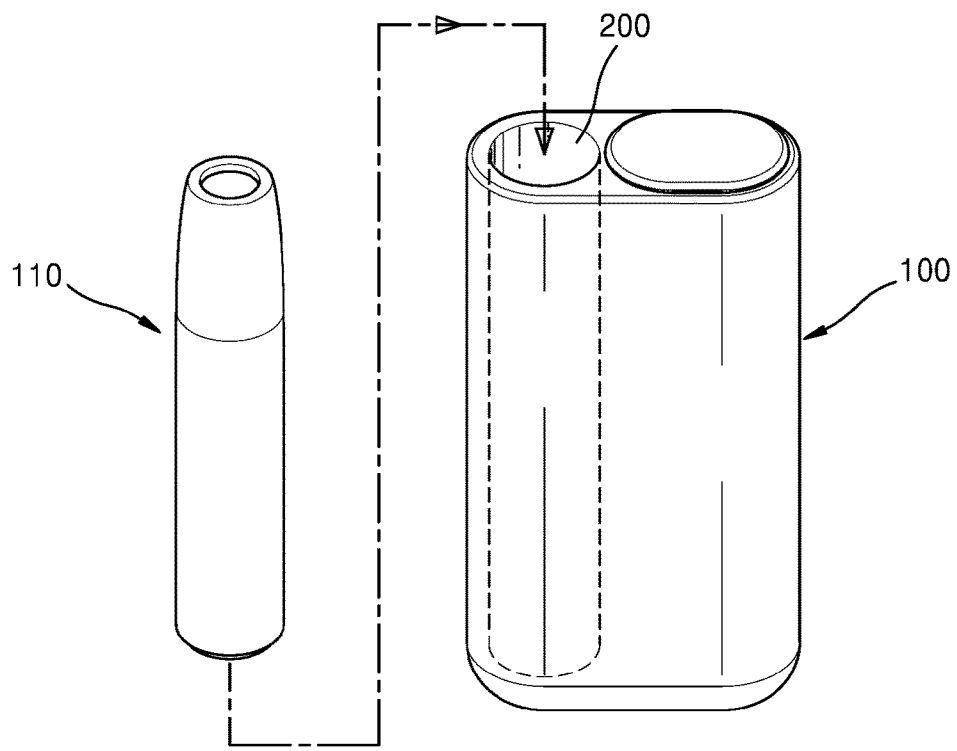

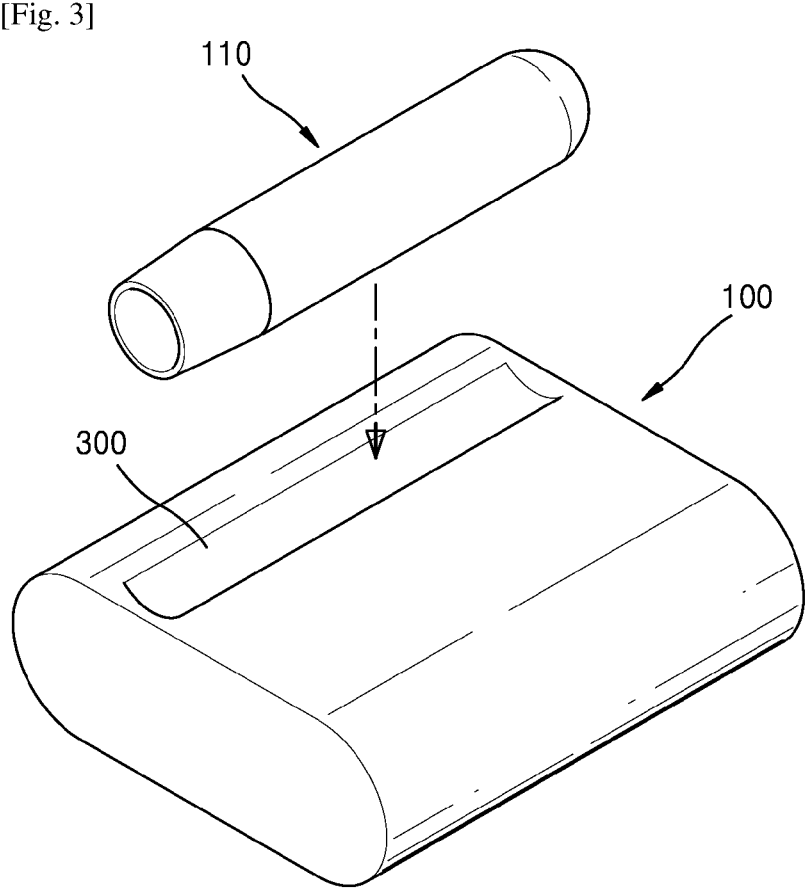

START
                           │  ╱410
           ┌───────────────▼───────────────┐
           │  FORM COMMUNICATION LINK WITH HOLDER │
           └───────────────┬───────────────┘
                           │  ╱420
           ┌───────────────▼───────────────┐
           │    DISPLAY DATA OBTAINED FROM    │
           │     SENSOR AND INDICATOR FOR     │
           │      ACTIVATING USER INTERFACE   │
           └───────────────┬───────────────┘
                           │  ╱430
           ┌───────────────▼───────────────┐
           │   OUTPUT PRE-STORED TEMPERATURE  │
           │   PROFILES THROUGH USER INTERFACE│
           │   IN RESPONSE TO FIRST USER INPUT OF │
           │        SELECTING INDICATOR       │
           └───────────────┬───────────────┘
                           │  ╱440
           ┌───────────────▼───────────────┐
           │  IN RESPONSE TO SECOND USER INPUT OF │
           │   SELECTING ANY ONE OF PRE-STORED│
           │   TEMPERATURE PROFILES, TRANSMIT │
           │    SELECTED TEMPERATURE PROFILE TO│
           │  HOLDER THROUGH COMMUNICATION LINK│
           └───────────────┬───────────────┘
                                            ╱450
                   ┌────────────────▼────────────────┐
                   │ CONTROL TEMPERATURE PROFILE USED │
                   │    TO HEAT AEROSOL GENERATING    │
                   │   MATERIAL BASED ON INFORMATION  │
                   │    REGARDING TEMPERATURE PROFILE │
                   └────────────────┬────────────────┘
                                    ▼
                                   END
```

[Fig. 5]
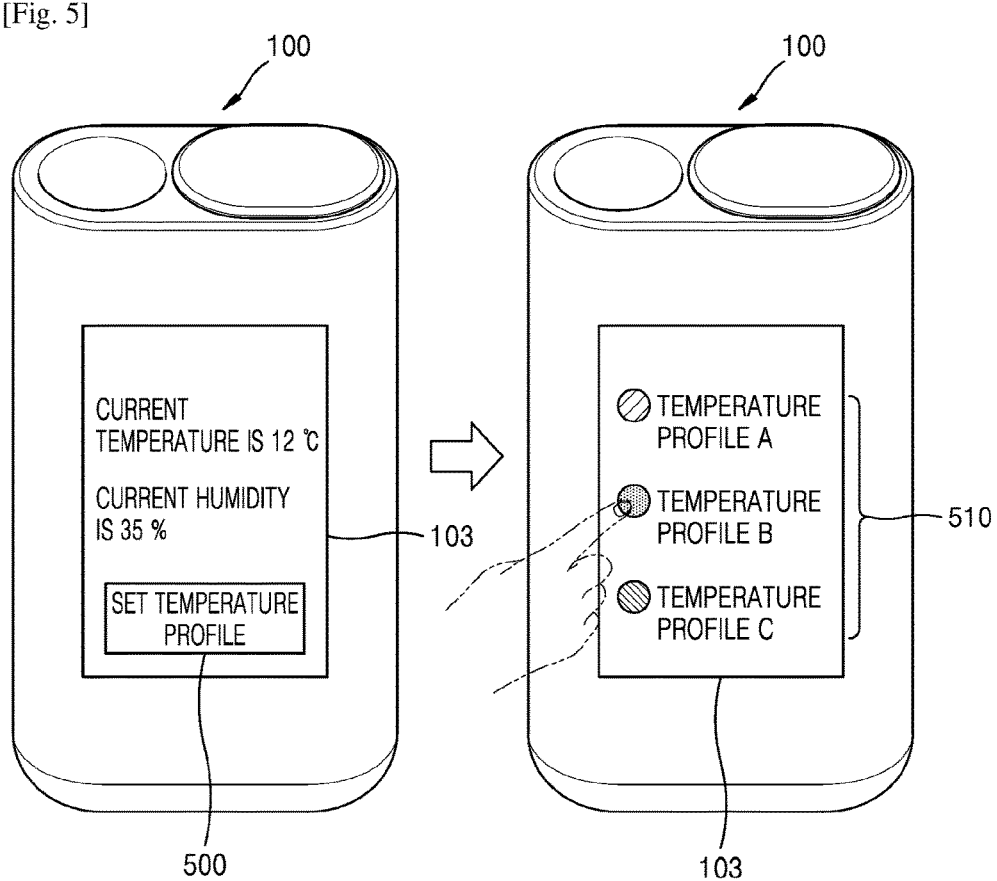
[Fig. 6]
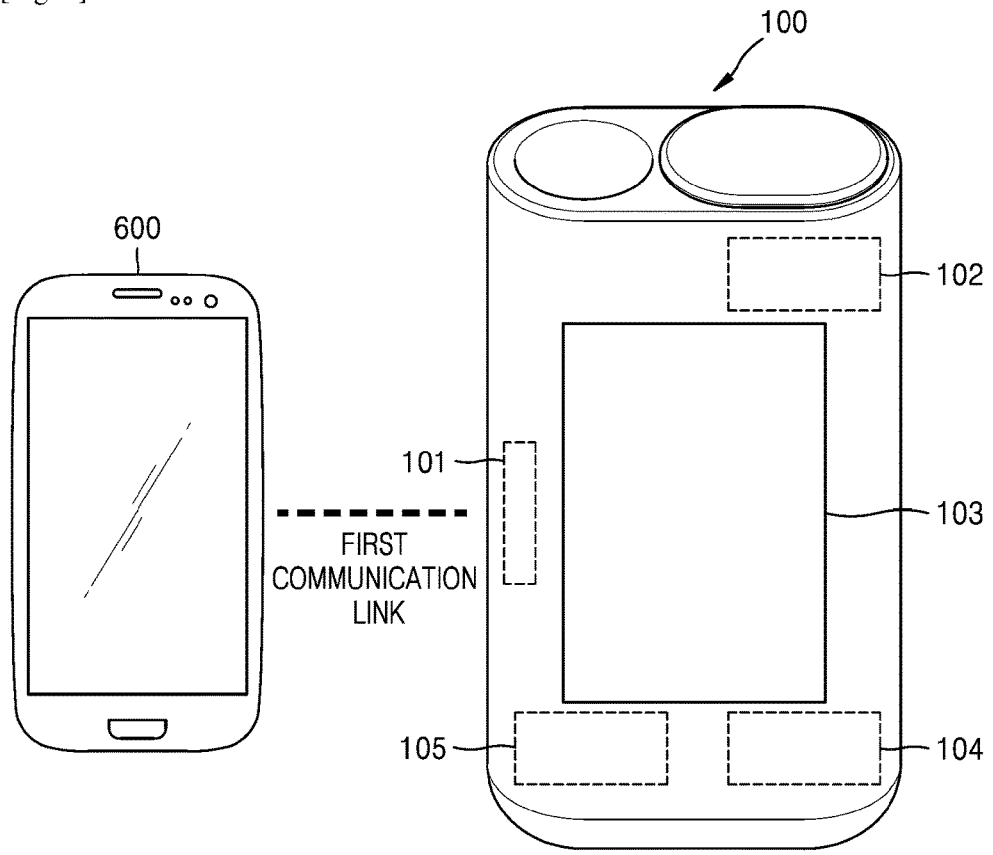

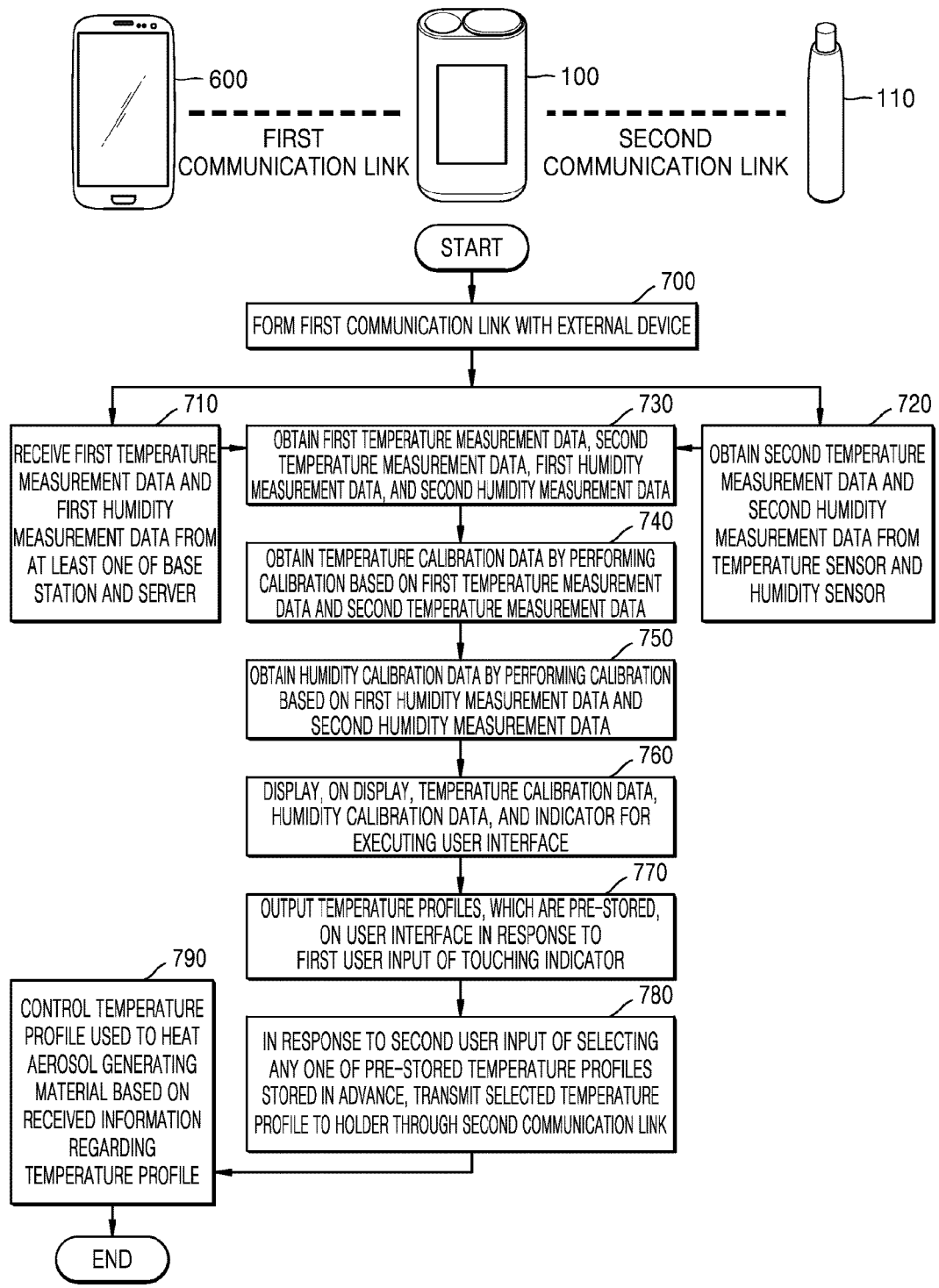
[Fig. 7]

ND OPERATION METHOD THEREOF

CROSS REFERENCE TO RELATED APPLICATIONS

This application is a National Stage of International Application No. PCT/KR2020/014417 filed Oct. 21, 2020, claiming priority based on Korean Patent Application No. 10-2019-0130400 filed Oct. 21, 2019.

TECHNICAL FIELD

One or more embodiments relate to an aerosol generating device for generating aerosols by heating an aerosol generating material.

BACKGROUND ART

Recently, the demand for an alternative to traditional cigarettes has greatly increased. For example, there is growing demand for a method of generating aerosol by heating an aerosol generating material in an aerosol generating article (e.g., a cigarette), rather than by combusting cigarettes. Accordingly, research into a heating-type aerosol generating device have been actively conducted.

A heater included in the aerosol generating device receives power and heats an aerosol generating material. To generate an appropriate amount of aerosol consistently, it is crucial to control power supplied to the heater according to a desired temperature profile.

DISCLOSURE

Technical Problem

Because aerosol vaporization is affected by an external temperature and external humidity, it may be difficult to provide a user with uniform and satisfactory smoking sensation. Additional aspects will be set forth in part in the description which follows and, in part, will be apparent from the description, or may be learned by the practice of the presented embodiments.

Technical Solution

The present disclosure allows the user to easily control a temperature profile by considering an external temperature and external humidity.

According to one or more embodiments, an aerosol generating device includes a holder configured to generate aerosols; and a cradle configured to detachably combine with the holder and comprising: a first communication circuit configured to form a communication link with the holder; a display; a sensor; and a first control circuit configured to: display, on the display, data obtained from the sensor and an indicator for activating a user interface, output through the user interface a plurality of pre-stored temperature profiles in response to a first user input of selecting the indicator, and in response to a second user input of selecting any one of the plurality of the pre-stored temperature profiles, transmit the selected temperature profile to the holder through the communication link, wherein the holder comprises: a second communication circuit configured to form the communication link with the cradle; and a second control circuit configured to control a temperature profile used to heat an aerosol generating material, based on the selected temperature profile.

Advantageous Effects

The present disclosure provides an aerosol generating device for generating aerosol by heating an aerosol generating material. In detail, external temperature measurement data and external humidity measurement data may be displayed on a display of a cradle to be delivered to a user. Accordingly, the user may select a temperature profile used to heat an aerosol generating material based on the external temperature measurement data and the external humidity measurement data displayed on the display. Because a holder controls a temperature profile used to heat the aerosol generating material based on the temperature profile selected by the user, it is possible to provide the user with uniform and satisfactory smoking sensation.

DESCRIPTION OF DRAWINGS

FIG. 1 is a diagram of an example of an aerosol generating device.

FIG. 2 is a diagram of an example in which a holder is coupled to a cradle.

FIG. 3 is a diagram of another example in which the holder is coupled to the cradle.

FIG. 4 is a flowchart of an example of a method of controlling a temperature profile of an aerosol generating device.

FIG. 5 is a diagram of an example in which a user selects a temperature profile.

FIG. 6 is a diagram of an example of an external device and a cradle.

FIG. 7 is a flowchart of another example of a method of controlling a temperature profile of an aerosol generating device.

BEST MODE

According to one or more embodiments, an aerosol generating device includes a holder configured to generate aerosols; and a cradle configured to detachably combine with the holder and comprising: a first communication circuit configured to form a communication link with the holder; a display; a sensor; and a first control circuit configured to: display, on the display, data obtained from the sensor and an indicator for activating a user interface, output through the user interface a plurality of pre-stored temperature profiles in response to a first user input of selecting the indicator, and in response to a second user input of selecting any one of the plurality of the pre-stored temperature profiles, transmit the selected temperature profile to the holder through the communication link, wherein the holder comprises: a second communication circuit configured to form the communication link with the cradle; and a second control circuit configured to control a temperature profile used to heat an aerosol generating material, based on the selected temperature profile.

The sensor may include at least one of a temperature sensor and a humidity sensor, and the data includes at least one of an external temperature measured by the temperature sensor and an external humidity measured by the humidity sensor.

The communication like may be formed according to at least one of Wi-Fi, a short-range wireless communication manner including at least one of Wi-Fi, Bluetooth, Zigbee, Wi-Fi Direct (WFD), Ultra-wideband (UWB), Bluetooth Low Energy (BLE), and Near Field Communication (NFC).

According to one or more embodiments, an aerosol generating device includes a holder configured to generate aerosols; and a cradle configured to detachably combine with the holder and comprising: a communication circuit configured to form a communication link with an external device; a display; and a control circuit configured to: receive, from the external device through the communication link, data that is communicated between the external device and at least one of a base station and a server, and display the received data on the display of the cradle.

The data may include information received from the external device in real time and including at least one of voice call information, video call information, text message information, and multimedia message information.

The data may include at least one of first temperature measurement data and first humidity measurement data that the external device obtains from at least one of the base station and the server.

The communication link may correspond to a first communication link, the communication circuit may be configured to form a second communication link with the holder, and the control circuit may be configured to display, on the display, data obtained from a sensor included in at least one of the holder and the cradle.

The sensor may include at least one of a temperature sensor and a humidity sensor, and the data may correspond to at least one of second temperature measurement data and second humidity measurement data.

The first communication link and the second communication link may be formed according to at least one of Wi-Fi, Bluetooth, Zigbee, Wi-Fi Direct (WFD), ultrawideband (UWB), Bluetooth Low Energy (BLE), and Near Field Communication (NFC).

A first communication protocol for forming the first communication link may differ from a second communication protocol for forming the second communication link.

The control circuit may be configured to obtain temperature calibration data indicating an external temperature by performing calibration based on the first temperature measurement data and the second temperature measurement data, obtain humidity calibration data indicating an external humidity by performing calibration based on the first humidity measurement data and the second humidity measurement data, and display, on the display, an indicator for activating a user interface, the temperature calibration data, and the humidity calibration data.

The control circuit may be configured to output through the user interface a plurality of pre-stored temperature profiles in response to a first user input of selecting the indicator, and in response to a second user input of selecting any one of the plurality of pre-stored temperature profiles, transmit the selected temperature profile to the holder through the second communication link.

The communication circuit may corresponds to a first communication circuit, the control circuit may corresponds to a first control circuit, and the holder may include: a second communication circuit configured to form the second communication link with the cradle; and a second control circuit configured to control a temperature profile used to heat the aerosol generating material, based on the selected temperature profile.

According to one or more embodiments, a cradle for a holder that generates aerosols includes: a first communication circuit configured to form a communication link with the holder; a display exposed through at least a portion of the cradle; a sensor; and a first control circuit configured to control the first communication circuit and the display, wherein the first control circuit is configured to display, on the display, data obtained from the sensor and an indicator for activating a user interface, output through the user interface a plurality of pre-stored temperature profiles, in response to a first user input of touching the indicator, and in response to a second user input of selecting any one of the plurality of pre-stored temperature profiles, transmit the selected temperature profile to the holder through the communication link.

According to one or more embodiments, a cradle for a holder that generates aerosols includes a communication circuit configured to form a communication link with an external device; a display exposed through at least a portion of the cradle; and a control circuit, wherein the control circuit is configured to receive data that is communicated between the external device and at least one of a base station and a server, from the external device through the communication link, and display the received data on the display of the cradle.

Mode for Invention

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout.

Hereinafter, the present disclosure will now be described more fully with reference to the accompanying drawings, in which exemplary embodiments of the present disclosure are shown such that one of ordinary skill in the art may easily work the present disclosure. The disclosure can, however, be embodied in many different forms and should not be construed as being limited to the embodiments set forth herein.

Hereinafter, embodiments of the present disclosure will be described in detail with reference to the drawings.

FIG. 1 is a diagram of an example of an aerosol generating device.

An aerosol generating device 1 may include a cradle 100 and a holder 110. The holder 110 for generating aerosol may be mounted on the cradle 100. The cradle 100 and the holder 110 may be detachably combined.

The cradle 100 may include a first communication circuit 101, a first control circuit 102, a display 103, a first battery 104, and a sensor 105. The holder 110 may include a second communication circuit 111, a second control circuit 112, a heater 113, and a second battery 114.

However, an internal structure of the cradle 100 and the holder 110 is not limited to that of FIG. 1. According to the design of the cradle 100 and the holder 110, it will be understood by one of ordinary skill in the art that some of the hardware components shown in FIG. 1 may be omitted or new components may be added.

Referring to FIGS. 2 and 3, the holder 110 may be detachably coupled to the cradle 100.

FIG. 2 is a diagram of an example in which a holder is coupled to a cradle.

Referring to FIG. 2, the holder 110 may be coupled to the cradle 100 in a state in which the holder 110 is accommodated in an internal space 200 of the cradle 100. The internal space 200 may be formed in a lengthwise direction of the cradle 100. FIG. 2 shows that the internal space 200 is formed in the lengthwise direction of the cradle 100, but one or more embodiments are not limited thereto. The internal space 200 may be formed in an arbitrary direction in which at least part of the holder 110 may be accommodated.

FIG. 3 is a diagram of another example in which a holder is coupled to a cradle.

Referring to FIG. 3, the holder 110 may be coupled to the cradle 100 while the holder 110 is mounted in a groove 300 of cradle 100. FIG. 3 shows that the groove 300 is formed in the lengthwise direction of the cradle 100, but one or more embodiments are not limited thereto. The groove 300 may be formed in the cradle 100 in various directions in which the holder 110 may be placed.

The first communication circuit 101 of the cradle 100 may include at least one communication interface for receiving/transmitting data from/to other devices. For example, the first communication circuit 101 may include at least one component that helps communication with the holder 110. The first communication circuit 101 may form a communication link with the holder 110. The communication link may perform short-range wireless communication according to at least one of Wi-Fi, Bluetooth, Zigbee, Wi-Fi Direct (WFD), ultrawideband (UWB), Bluetooth Low Energy (BLE), and Near Field Communication (NFC). However, one or more embodiments are not limited thereto. The communication link may be formed in a wired communication manner such as a Universal Serial Bus (USB) communication cable.

The first control circuit 102 of the cradle 100 may be hardware that controls overall operations of the cradle 100. The first control circuit 102 includes at last one processor. A processor may be implemented as an array of a plurality of logic gates or may be implemented as a combination of a general-purpose microprocessor and a memory in which a program executable in the microprocessor is stored. Also, it will be understood by one of ordinary skill in the art that the processor may be implemented in other forms of hardware.

The first control circuit 102 may determine whether the cradle 100 is coupled to the holder 110 and control the operation of the cradle 100 according to whether the cradle 100 is coupled to or separated from the holder 110.

For example, when the cradle 100 is coupled to the holder 110, the first control circuit 102 may charge the second battery 114 of the holder 110 or provide power to the heater 113 by providing power of the first battery 104 to the holder 110. Therefore, even when the remaining capacity of the second battery 114 of the holder 110 is small, the user may keep smoking after coupling the cradle 100 to the holder 110.

Also, the cradle 100 may include the display 103 exposed through at least a portion of the cradle 100. Visual information may be output through the display 103 of the cradle 100. When the cradle 100 is coupled to the holder 110 or when a user input is received, the display 103 may be turned on. For example, a user input may include a push input, a tap input, a touch & hold input, a double tap input, a drag input, a panning input, a flick input, a drag & drop input, or the like.

Also, the cradle 100 may further include the sensor 105. For example, the sensor 105 may include a temperature sensor and/or a humidity sensor. The temperature sensor and the humidity sensor may be located not in the cradle 100 but in the holder 110. That is, the temperature sensor and the humidity sensor may be located on at least one of the cradle 100 and the holder 110, and may detect an external temperature and external humidity, respectively.

The first control circuit 102 may generate a signal to be displayed on the display 103 and thus may transmit, to the user, data obtained from a sensor included in at least one of the cradle 100 and the holder 110.

Also, the first control circuit 102 may generate a signal to be displayed on the display 103 and thus may transmit, to the user, information regarding the first battery 104 (e.g., the remaining capacity of the first battery 104, availability, etc.), information regarding the reset of the holder 110 (e.g., a reset schedule, a reset progress, completion of resetting, etc.), information regarding the cleaning of the holder 110 (e.g., a cleaning timing, a cleaning need, a cleaning process, completion of cleaning, etc.), information regarding charging of the cradle 100 (e.g., a need for charging of the cradle 100, charging progress, completion of charging, etc.), or the like.

When the display 103 is on, the first control circuit 102 may control the display 103 to display thereon graphic objects indicating respective functions. When a user input is received on the graphic object displayed on the display 103, a function corresponding to the displayed graphic object may be performed. For example, the functions may include a function for adjusting a temperature profile used by the holder 110 to heat an aerosol generating material, a function for preheating the heater 113 of the holder 110, a function for cleaning a space of the holder 110 where a cigarette is inserted, a function for checking whether the cradle 100 is operable, a function for displaying the remaining capacity (available power) of the first battery 104, a function for resetting the cradle 100, and the like.

For example, as shown in FIG. 1, the user may adjust a temperature profile used to heat the aerosol generating material by selecting any one of the pre-stored temperature profiles displayed on the display 103. In this case, the user may select any one of the pre-stored temperature profiles, based on the external temperature and the external humidity measured by the sensor 105 and displayed on the display 103.

Because an internal temperature and internal humidity of the holder 110 are affected by a temperature and humidity of external air, it may be difficult to provide the user with uniform and satisfactory smoking sensation. Accordingly, as described above, when the user adjusts the temperature profile based on the external temperature measurement data and the external humidity measurement data, it may be possible to provide the user with constant and satisfactory smoking sensation.

Also, the cradle 100 may include at least one input device (e.g., a button) by which the user may control a function of the cradle 100, a terminal coupled to the holder 110, and/or an interface (e.g., a USB port, etc.) for charging the first battery 104.

The first battery 104 of the cradle 100 may supply power used to drive the cradle 100. For example, the first battery 104 may charge the second battery 114 by supplying power to the second battery 114 of the holder 110. Also, when the holder 110 is coupled to the cradle 100, the first battery 104 may supply power to be used for the holder 110 to operate. For example, when a terminal of the holder 110 is coupled to a terminal of the cradle 100, the holder 100 may be driven by power supplied by the first battery 104 regardless of the remaining capacity of the second battery 114.

Similarly to the first communication circuit 101, the second communication circuit 111 of the holder 110 may include at least one communication interface for receiving/transmitting data from/to other devices. For example, the second communication circuit 111 may include at least one component allowing the communication with the cradle 100. The second communication circuit 111 may form a communication link with the cradle 100.

An internal space may be formed around the heater 113 of the holder 110, and a cigarette 115 (i.e., an aerosol generating article containing an aerosol generating material) may be inserted into the internal space. When the cigarette 115 is inserted into the holder 110, the holder 110 controls an output voltage of the second battery 114 such that a temperature of the heater 113 increases. As the aerosol generating material in the cigarette 115 is heated by the heater 113, aerosol is generated.

The second control circuit 112 of the holder 110 is hardware that controls overall operations of the holder 110. The second control circuit 112 includes at least one processor. A processor can be implemented as an array of a plurality of logic gates or can be implemented as a combination of a general-purpose microprocessor and a memory in which a program executable in the microprocessor is stored. Also, it will be understood by one of ordinary skill in the art that the processor can be implemented in other forms of hardware.

For example, the second control circuit 112 may receive information regarding a user input to select the graphic object displayed on the display 103, from the first control circuit 102 through the communication link. The second control circuit 112 may control power to be supplied to the heater 113 to start or terminate the operation of the heater 113, based on the information regarding the user input to select the graphic object displayed on the display 103. Also, the second control circuit 112 may control an amount of power supplied to the heater 113 and a power supply period, to make the heater 113 be heated to a certain temperature or maintain an appropriate temperature, based on the information regarding the user input on the graphic object displayed on the display 103.

Alternatively, the second control circuit 112 may control power supplied to the heater 113, based on a result of the sensing by the at least one sensor. The sensor may include a temperature sensor and/or a humidity sensor. The temperature sensor and the humidity sensor may detect an external temperature and external humidity.

The heater 113 of the holder 110 may receive power from the second battery 114 according to the control of the second control circuit 112. The heater 113 may heat the cigarette 115 inserted into the holder 110 by the power received from the second battery 114.

The heater 113 may be formed of any suitable electrically resistive material. For example, the suitable electrically resistive material may be a metal or a metal alloy including titanium, zirconium, tantalum, platinum, nickel, cobalt, chromium, hafnium, niobium, molybdenum, tungsten, tin, gallium, manganese, iron, copper, stainless steel, or nichrome, but is not limited thereto. Also, the heater 113 may be implemented by a metal wire, a metal plate on which an electrically conductive track is arranged, or a ceramic heating element, but is not limited thereto.

In an embodiment, the heater 113 may heat the cigarette 115 inserted into an accommodation space of the holder 110. As the cigarette 115 is accommodated in the accommodation space of the holder 110, the heater 113 may be located inside and/or outside the cigarette 115. Accordingly, the heater 113 may generate the aerosol by heating the aerosol generating material in the cigarette 115.

The second battery 114 of the holder 110 supplies power to be used for the holder 110. For example, the second battery 114 may supply power such that the heater 113 may be heated. Also, the second battery 114 may supply power required for operations of other hardware components included in the holder 110.

The first battery 104 and the second battery 114 may each be a rechargeable battery or a disposable battery. For example, the first battery 104 and the second battery 114 may be a $LiFePO_4$ battery, a $LiCoO_2$ battery, a $Li_4Ti_5O_{12}$ battery, or a LiPoly battery, but are not limited thereto.

In the present embodiment, the temperature profile used to heat the aerosol generating material may be controlled by using a communication link between the cradle 100 and the holder 110, and it will be described below with reference to FIG. 4.

Throughout this specification, descriptions provided with reference to FIG. 1 may be applied to components having the same reference symbols as the components included in the cradle 100 and the holder 110 of FIG. 1.

FIG. 4 is a flowchart of an example of a method of controlling a temperature profile of an aerosol generating device.

Referring to FIG. 4, in operation 410, the cradle 100 may form a communication link with the holder 110. The first communication circuit 101 of the cradle 100 and the second communication circuit 111 of the holder 110 may perform short-range wireless communication according to at least one of Wi-Fi, Bluetooth, Zigbee, WFD, UWB, BLE, and NFC.

In operation 420, the cradle 100 may display, on the display 103, data obtained from the sensor 105 and an indicator for executing (i.e., activating) a user interface. The sensor 105 may include a temperature sensor and/or a humidity sensor. The temperature sensor may measure an external temperature, and the humidity sensor may measure external humidity.

External air may be introduced while aerosol is generated as the heater 113 of the holder 110 heats the aerosol generating material in the cigarette 115. When the external air is introduced, an internal temperature and internal humidity of the holder 110 may be affected by a temperature and humidity of the external air. Accordingly, it may be difficult to provide the user with uniform and satisfactory smoking sensation.

For example, when the external temperature is high, the cigarette 115 may likely taste burnt as the aerosol generating material therein is heated, and when the external humidity is high, an excessive amount of aerosol may be generated. Also, when the external temperature is low, the aerosol generating material in the cigarette 115 may not be able to fully generate the intended flavor, and when the outside humidity is high, an insufficient amount of aerosol may be generated.

To solve such problems, the first control circuit 102 of the cradle 100 may display, on the display 103, the external temperature measurement data and the external humidity measurement data obtained by the sensor 105 to show the same to the user. Accordingly, the user may adjust the temperature profile used to heat the aerosol generating material, based on the external temperature measurement data and the external humidity measurement data displayed on the display 103. Because the user may adjust the temperature profile based on the external temperature measurement data and the humidity measurement data, it may be possible to provide the user with the uniform and satisfactory smoking sensation.

FIG. 5 is a diagram of an example in which the user selects a temperature profile.

Referring to FIG. 5, the temperature measurement data and the humidity measurement data, which are obtained from the sensor included in at least one of the holder 110 and the cradle 100, may be displayed on the display 103 of the cradle 100. For example, a sentence such as 'the current temperature is 12° C.,' or 'the current humidity is 35%,' may be displayed on the display 103.

Also, the cradle 100 may display, on the display 103, an indicator 500 for executing (i.e., activating) a user interface to control a temperature profile. When a first user input of selecting the indicator is transmitted to the first control circuit 102, the user interface may be executed. For example, the first user input may include a push input, a tap input, a touch & hold input, a double tap input, a drag input, a panning input, a flick input, a drag & drop input, or the like.

For example, referring to FIG. 5, an indicator 500 such as 'set temperature profile' may be displayed on the display 103. When the user touches the indicator 500 that is 'set temperature profile,' the user interface 510 for controlling (i.e., adjusting) a temperature profile may be executed.

Referring back to FIG. 4, in operation 430, the cradle 100 may output pre-stored temperature profiles on the user interface in response to the first user input on the indicator.

The cradle 100 may further include a memory, and the memory may pre-store therein a plurality of temperature profiles among which the user may select one to adjust the temperature of the heater 113 according to at least one of an external temperature and external humidity. Each temperature profile includes numerical information indicating how the temperature of the heater 113 needs to be increased or decreased according to a certain function or pattern.

Referring to FIG. 5, when the first user input on the indicator for executing the user interface is transmitted to the first control circuit 102, the cradle 100 may output the pre-stored temperature profiles 510 on the user interface in response to the first user input. For example, the pre-stored temperature profiles 510 may include a temperature profile A, a temperature profile B, and a temperature profile C.

The user may select any one of the temperature profile A, the temperature profile B, and the temperature profile C based on the temperature measurement data and the humidity measurement data. The temperature profile A, the temperature profile B, and the temperature profile C may be included in the pre-stored temperature profiles to provide the user with the uniform and satisfactory smoking sensation, according to at least one of the external temperature and external humidity. The number of pre-stored temperature profiles is not limited thereto.

For example, the temperature profile A, the temperature profile B, and the temperature profile C may respectively correspond to a high-temperature and high-humidity environment, a room-temperature and medium-humidity environment, and a low-temperature and low-humidity environment. When an external temperature is equal to or greater than 40° C. and external humidity is between about 40% and about 90%, the environment may be determined to be the high-temperature and high-humidity environment. When the external temperature is between about −20° C. and about 26° C. and the external humidity is between about 0% and about 40%, the environment may be determined to be the room-temperature and medium-humidity environment. When external temperature is less than or equal to −20° C. and the external humidity is less than or equal to 0%, the environment may be determined to be the low-temperature and low-humidity environment. However, one or more embodiments are not limited thereto, and the temperature profiles may be classified according to various classification standards.

Referring back to FIG. 4, in operation 440, in response to a second user input of selecting any one of the pre-stored temperature profiles, the cradle 100 may transmit the selected temperature profile to the holder 110 through the communication link. For example, the cradle may send an identifier of the selected temperature profile such that the holder 110 may retrieve the corresponding temperature profile from its internal memory or another external device.

As described above, the cradle 100 may display, on the display 103, the pre-stored temperature profiles. When the second user input of selecting one of the pre-stored temperature profiles is transmitted to the first control circuit 102, the first control circuit 102 may transmit the selected temperature profile to the holder 110 through the communication link. For example, the second user input may include a push input, a tap input, a touch & hold input, a double tap input, a drag input, a panning input, a flick input, a drag & drop input, or the like.

For example, referring to FIG. 5, when the current external temperature is 12° C. and the current external humidity is 35%, a user may select the temperature profile B, which corresponds to the room-temperature and medium-humidity environment. In this case, a user input to select a graphic object indicating the temperature profile B may be received on the display 103, and may be transmitted to the first control circuit 102. Also, the first control circuit 102 of the cradle 100 may transmit information regarding the temperature profile B to the second control circuit 112 of the holder 110 through the communication link.

In operation 450, the holder 110 may control the temperature profile used to heat the aerosol generating material based on information regarding the temperature profile.

The second control circuit 112 of the holder 110 may generate a control signal according to the temperature profile transmitted from the first control circuit 102 of the cradle 100 and may control power to be supplied to the heater 113 to adjust the temperature of the heater 113 according to the corresponding temperature profile. By applying the pre-stored temperature profiles based on the external temperature and external humidity, it may be possible to provide the user with the uniform smoking sensation regardless of an external temperature and external humidity.

FIG. 6 is a diagram of an example of an external device and a cradle.

An external device 600 may be an electronic terminal capable of receiving/transmitting data from/to another device via wired/wireless communication and may be portable. For example, the external device 600 may include a smart phone, a tablet computer, a personal digital assistant (PDA), or a portable multimedia player (PMP). The external device 600 of FIG. 6 is an example, and one or more embodiments of the present disclosure are not limited to the illustration of FIG. 6.

The holder 110 for generating aerosol may be mounted on the cradle 100. The cradle 100 may include the first communication circuit 101, the first control circuit 102, the display 103, the first battery 104, and the sensor 105.

The first communication circuit 101 of the cradle 100 may include at least one component allowing the communication with an external device 600. The first communication circuit 101 may form a first communication link with the external device 600. The communication link may perform short-range wireless communication according to at least one of Wi-Fi, Bluetooth, Zigbee, WFD, UWB, BLE, and NFC. However, one or more embodiments are not limited thereto, and the communication link may be formed in a wired communication manner such as a USB communication cable.

The first control circuit 102 of the cradle 100 may receive data, which is communicated between the external device 600 and at least one of a base station and a server, from the external device 600 through the first communication link.

The data may include at least one of voice call information, video call information, and text message/multimedia message information received from the external device 600 in real time, but is not limited thereto.

Also, the data may include at least one of the first temperature measurement data and the first humidity measurement data obtained by the external device 600 from at least one of a base station and a server. The first temperature measurement data may represent the external temperature, and the first humidity measurement data may represent the external humidity. For example, the first temperature measurement data and the first humidity measurement data may correspond to weather information that the external device 600 obtains from a website. Alternatively, the first temperature measurement data and the first humidity measurement data may correspond to weather information stored in an application included in the external device 600, but is not limited thereto.

The first control circuit 102 of the cradle 100 may display the received data on the display 103. By generating a signal to be displayed on the display 103, the first control circuit 102 may notify the user of the voice call information, the video call information, the text message/multimedia message information, and the like received from the external device 600. Accordingly, even if the user is not holding the external device 600 during smoking, the user may check the voice call information, video call information, the text message/multimedia message information, and the like through the display 103 of the cradle 100.

Also, the first control circuit 102 of the cradle 100 may display, on the display 103, the first temperature measurement data and the first humidity measurement data received from the external device 600 to be shown to the user. Accordingly, the user may optimize a temperature profile used to heat the aerosol generating material, based on the first temperature measurement data and the first humidity measurement data displayed on the display 103. Because the user may adjust a temperature profile based on the external temperature measurement data and the external humidity measurement data, it may be possible to provide the user with the consistent and satisfactory smoking sensation.

FIG. 7 is a flowchart of another example of a method of controlling a temperature profile of an aerosol generating device.

Referring to FIG. 7, in operation 700, the cradle 100 may form the first communication link with the external device 600. In this case, the first communication circuit of the cradle 100 may form the second communication link with the second communication circuit 111 of the holder 110. The first communication link and the second communication link may be formed based on short-range wireless communication protocol, such as Wi-Fi, Bluetooth, Zigbee, WFD, UWB, BLE, NFC, etc. Also, a first communication protocol for forming the first communication link may differ from a second communication protocol for forming the second communication link.

In operation 710, the external device 600 may receive the first temperature measurement data and the first humidity measurement data from at least one of the base station and the server. For example, the first temperature measurement data and the first humidity measurement data may correspond to weather information that the external device 600 obtains from a website. Alternatively, the first temperature measurement data and the first humidity measurement data may correspond to weather information stored in an application included in the external device 600, but is not limited thereto. FIG. 7 shows that the first temperature measurement data and the first humidity measurement data are received, but only the first temperature measurement data or the first humidity measurement data may be received.

In operation 720, the holder 110 may obtain second temperature measurement data and second humidity measurement data from a temperature sensor and a humidity sensor. The second temperature measurement data and the second humidity measurement data may be obtained by measuring an external temperature and external humidity. FIG. 7 shows that the holder 110 obtains the first temperature measurement data and the first humidity measurement data, but the holder 110 may obtain only the second temperature measurement data or the second humidity measurement data from the temperature sensor or the humidity sensor.

In operation 730, the cradle 100 may obtain the first temperature measurement data, the second temperature measurement data, the first humidity measurement data, and the second humidity measurement data. For example, the cradle 100 may obtain the first temperature measurement data and the first humidity measurement data from the external device 600 through the first communication link. Also, the cradle 100 may obtain the second temperature measurement data and the second humidity measurement data from the holder 110 through the second communication link. The cradle 100 may not receive the second temperature measurement data and the second humidity measurement data from the holder 110 and may directly obtain the same from the temperature sensor and the humidity sensor included in the cradle 100.

In operation 740, the cradle 100 may obtain temperature calibration data by performing calibration based on the first temperature measurement data and the second temperature measurement data. For example, the cradle 100 may obtain the temperature calibration data by calculating an average of temperature values respectively corresponding to the first temperature measurement data and the second temperature measurement data. Accordingly, the accuracy of measuring the external temperature may be improved.

In operation 750, the cradle 100 may obtain humidity calibration data by performing calibration based on the first humidity measurement data and the second humidity measurement data. For example, the cradle 100 may obtain the humidity calibration data by calculating an average of humidity values respectively corresponding to the first humidity measurement data and the second humidity measurement data. Accordingly, the accuracy of measuring an external humidity may be improved.

In operation 760, the cradle 100 may display, on the display 103, the indicator for executing the user interface, the temperature calibration data, and the humidity calibration data. Accordingly, the user may adjust the temperature profile based on the temperature calibration data and the humidity calibration data shown on the display 103. Also, the cradle 100 may display, on the display 103, the indicator for executing the user interface that allows the user to adjust the temperature profile. When the first user input on the indicator is transmitted to the first control circuit 102, the user interface may be executed. The user interface may receive a user input to adjust a temperature profile by detecting a touch input or recognizing a voice command of a user.

In operation 770, the cradle 100 may output the pre-stored temperature profiles by the user interface in response to the first user input of touching the indicator. The user interface may output sound corresponding to the pre-stored temperature profiles through a speaker.

The temperature profiles may be stored in a memory of the cradle 100, such that a user may adjust the temperature of the heater 113 according to the external temperature and humidity by selecting one of the pre-stored temperature profiles. For example, the temperature profiles may be respectively set according to the high-temperature and high-humidity environment, the room-temperature and medium-humidity environment, and the low-temperature and low-humidity environment. However, the temperature profiles are not limited thereto.

When the first user input to select the indicator for executing the user interface is transmitted to the first control circuit 102, the cradle 100 may output the pre-stored temperature profiles through the user interface, in response to the first user input.

In operation 780, in response to the second user input of selecting any one of the pre-stored temperature profiles, the cradle 100 may transmit the selected temperature profile to the holder 110 through the second communication link.

The user may select any one of the temperature profiles. In this case, a user input to select a graphic object indicating the selected temperature profile may be transmitted to the first control circuit 102 on the display 103. The user input may include a push input, a tap input, a touch & hold input, a double tap input, a drag input, a panning input, a flick input, a drag & drop input, or the like. The first control circuit 102 of the cradle 100 may transmit information regarding the temperature profile selected by the user to the second control circuit 112 of the holder 110 through the second communication link.

In operation 790, the holder 110 may control the temperature profile used to heat the aerosol generating material, based on the received information regarding the temperature profile. The second control circuit 112 may generate a control signal according to the temperature profile transmitted from the first control circuit 102 of the cradle 100 and thus may control power to adjust the temperature of the heater 113 according to the temperature profile.

At least one of the components, elements, modules or units (collectively "components" in this paragraph) represented by a block in the drawings, such as the first communication circuit 101, the first control circuit 102, the second communication circuit 111, and the second control circuit 112, may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

Those of ordinary skill in the art related to the present embodiments may understand that various changes in form and details can be made therein without departing from the scope of the characteristics described above. The disclosed methods should be considered in a descriptive sense only and not for purposes of limitation. The scope of the present disclosure is defined by the appended claims rather than by the foregoing description, and all differences within the scope of equivalents thereof should be construed as being included in the present disclosure.

The invention claimed is:

1. An aerosol generating device comprising:
   a holder configured to generate aerosols; and
   a cradle configured to detachably combine with the holder and comprising:
      a first communication circuit configured to form a communication link with the holder;
      a display;
      a sensor; and
      a first control circuit configured to:
         display, on the display, data obtained from the sensor and an indicator for activating a user interface,
         output through the user interface a plurality of pre-stored temperature profiles in response to a first user input of selecting the indicator, and
         in response to a second user input of selecting any one of the plurality of the pre-stored temperature profiles, transmit the selected temperature profile to the holder through the communication link, wherein the holder comprises:
- a second communication circuit configured to form the communication link with the cradle; and
- a second control circuit configured to control a temperature profile used to heat an aerosol generating material, based on the selected temperature profile.

2. The aerosol generating device of claim 1, wherein
the sensor includes at least one of a temperature sensor and a humidity sensor, and
the data includes at least one of an external temperature measured by the temperature sensor and an external humidity measured by the humidity sensor.

3. The aerosol generating device of claim 1, wherein the communication link is formed according to at least one of Wi-Fi, Bluetooth, Zigbee, Wi-Fi Direct (WFD), ultrawideband (UWB), Bluetooth Low Energy (BLE), and Near Field Communication (NFC).

4. An aerosol generating device comprising:
- a holder configured to generate aerosols; and
- a cradle configured to detachably combine with the holder and comprising:
  - a communication circuit configured to form a communication link with an external device;
  - a display; and
  - a control circuit configured to:
    - receive, from the external device through the communication link, data that is communicated between the external device and at least one of a base station and a server, and
    - display the received data on the display of the cradle.

5. The aerosol generating device of claim 4, wherein the data comprises information received from the external device in real time and including at least one of voice call information, video call information, text message information, and multimedia message information.

6. The aerosol generating device of claim 4, wherein the data comprises at least one of first temperature measurement data and first humidity measurement data that the external device obtains from at least one of the base station and the server.

7. The aerosol generating device of claim 6, wherein
the communication link corresponds to a first communication link,
the communication circuit is configured to form a second communication link with the holder, and
the control circuit is configured to display, on the display, data obtained from a sensor included in at least one of the holder and the cradle.

8. The aerosol generating device of claim 7, wherein the first communication link and the second communication link are formed according to at least one of Wi-Fi, Bluetooth, Zigbee, Wi-Fi Direct (WFD), ultrawideband (UWB), Bluetooth Low Energy (BLE), and Near Field Communication (NFC).

9. The aerosol generating device of claim 7, wherein a first communication protocol for forming the first communication link differs from a second communication protocol for forming the second communication link.

10. The aerosol generating device of claim 7, wherein
the sensor includes at least one of a temperature sensor and a humidity sensor, and
the data corresponds to at least one of second temperature measurement data and second humidity measurement data.

11. The aerosol generating device of claim 10, wherein the control circuit is configured to
- obtain temperature calibration data indicating an external temperature by performing calibration based on the first temperature measurement data and the second temperature measurement data,
- obtain humidity calibration data indicating an external humidity by performing calibration based on the first humidity measurement data and the second humidity measurement data,
- display, on the display, an indicator for activating a user interface, the temperature calibration data, and the humidity calibration data,
- output through the user interface a plurality of pre-stored temperature profiles in response to a first user input of selecting the indicator, and
- in response to a second user input of selecting any one of the plurality of pre-stored temperature profiles, transmit the selected temperature profile to the holder through the second communication link.

12. The aerosol generating device of claim 11, wherein
the communication circuit corresponds to a first communication circuit,
the control circuit corresponds to a first control circuit, and
the holder comprises:
- a second communication circuit configured to form the second communication link with the cradle; and
- a second control circuit configured to control a temperature profile used to heat an aerosol generating material, based on the selected temperature profile.

13. A cradle configured to detachably combine with a holder that generates aerosols, the cradle comprising:
- a first communication circuit configured to form a communication link with the holder;
- a display;
- a sensor; and
- a first control circuit configured to:
  - display, on the display, data obtained from the sensor and an indicator for activating a user interface,
  - output through the user interface a plurality of pre-stored temperature profiles in response to a first user input of selecting the indicator, and
  - in response to a second user input of selecting any one of the plurality of the pre-stored temperature profiles, transmit the selected temperature profile to the holder through the communication link.

14. A cradle configured to detachably combine with a holder that generates aerosols, the cradle comprising:
- a communication circuit configured to form a communication link with an external device;
- a display; and
- a control circuit configured to:
  - receive, from the external device through the communication link, data that is communicated between the external device and at least one of a base station and a server, and
  - display the received data on the display of the cradle.

* * * * *